3,043,772
METHOD OF TREATING WATER SYSTEMS AND PRODUCTS USEFUL THEREIN
Robert W. Liddell, Bethel, Pa., assignor, by mesne assignments, to Hagan Chemicals & Controls, Inc., a corporation of Pennsylvania
Filed Aug. 27, 1956, Ser. No. 606,318
11 Claims. (Cl. 210—57)

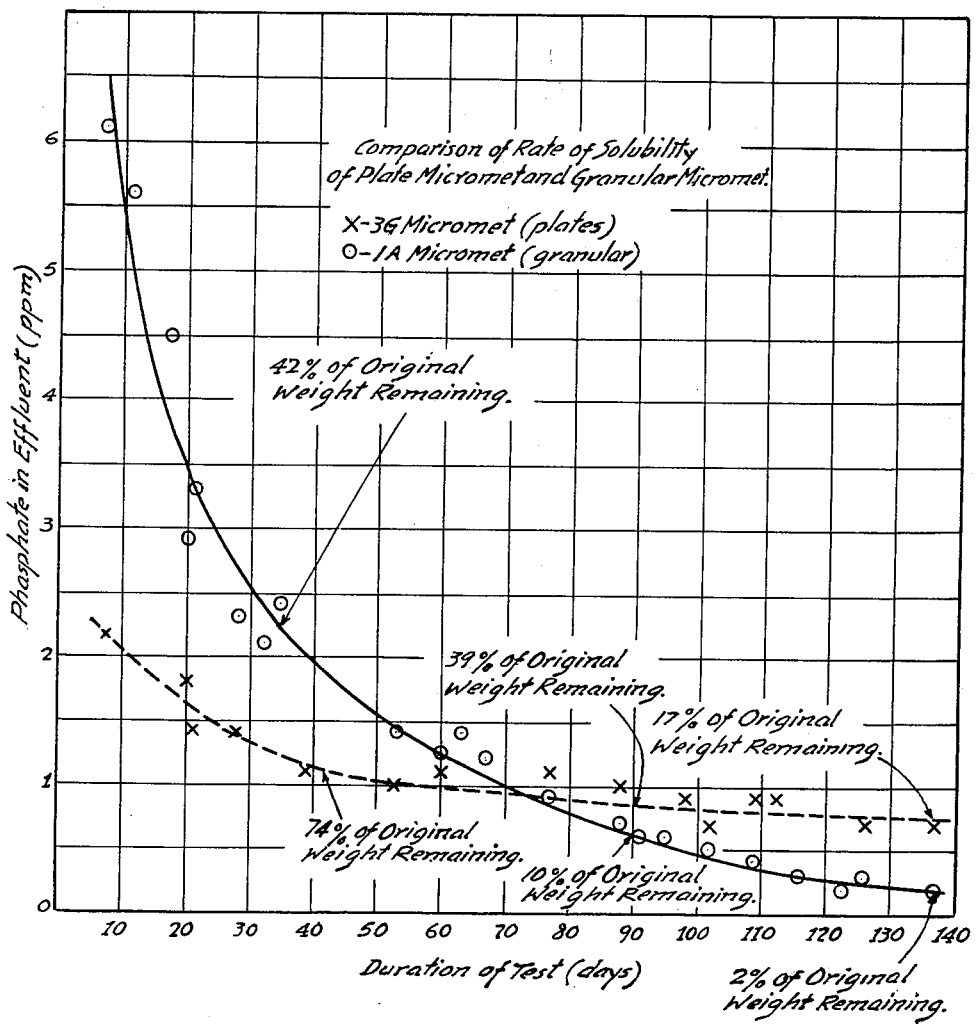

This invention relates in general to a novel method of maintaining for long periods of time the desired concentration of a slowly soluble water treating composition in water systems, and to products suitable for accomplishing this purpose.

In particular it relates to compositions containing three basic ingredients, these being:

(1) $P_2O_5$,
(2) A solubilizing alkali metal oxide, as for example $Na_2O$, $K_2O$, or the like,
(3) An insolubilizing metal oxide, as for example ZnO, MgO, CaO, SrO, BaO, $Al_2O_3$ or $Fe_2O_3$ or the like.

The use of alkali metal polyphosphates to treat water has been well known in the art for many years. These compounds have been used for sequestering dissolved calcium and magnesium salts to "soften" the water and more recently have been adopted as effective methods for stabilizing dissolved iron in water (U.S. Patent 2,304,850), inhibiting calcium carbonate scale formation (U.S. Patent 2,358,222), and in controlling corrosion in water systems (U.S. Patent 2,337,856). In 1938 application Serial No. 222,258, filed in the name of George B. Hatch, covered the use of very slowly water-soluble molecularly dehydrated phosphates which at the time were designated as "water-insoluble" to distinguish them from the rapidly water-soluble phosphates such as sodium hexametaphosphate, sodium tripolyphosphate, and other related salts of polyphosphoric acids. U.S. Patent 2,539,305 relating to a process of inhibiting the precipitation of calcium carbonate from water using these slowly soluble phosphates, and U.S. Patent 2,601,395 relating to a specific composition to be employed in the treatment of water, and for other uses, issued on applications which were continuations of application Serial No. 222,258, now abandoned.

The slowly soluble molecularly dehydrated phosphates have elsewhere been described in the patented art including U.S. Patents 2,370,472 and 2,370,473. In these patents, as well as in the earlier patents hereinbefore mentioned, these slowly soluble phosphates have been disclosed per se or, if a physical form of product is mentioned, it has been in terms of granular or cube-like products. These products are obtained by grinding large random-sizes and shaped pieces of glass as they are removed from the chilling tables or pans upon which a molten glass of the desired composition is poured. These products have been used extensively in treating water by placing them in a dispensing device which is usually self-feeding in nature. The phosphate product is employed somewhat in a manner of a filter over which the water to be treated is flowed. The phosphate is capable of supplying to the water the minute amounts of polyphosphate radical required to (a) inhibit the precipitation of calcium carbonate and/or (b) stabilize dissolved iron in the water and/or (c) reduce red water formation caused by corrosion of water-transporting equipment. A form of feeding device is shown in the drawing of Hatch Patent 2,539,305 although there are many modifications of this device and considerable improvement in feeding equipment has occurred since the original concept.

At the present time the granular form of slowly soluble polyphosphate most widely used in industry, commerce, and the home for water treating purposes as heretofore outlined is a $P_2O_5$—CaO—$Na_2O$ glassy composition. The weight ratio of components for various formulations will vary appreciably, particularly the alkaline earth metal oxide and the alkali metal oxide. The $P_2O_5$ content is usually maintained at a fairly constant level in the available formulations so that adequate phosphate ions are supplied to the water for the purpose intended. On a molar percentage basis, the ranges will be as follows:

$P_2O_5$ from about 46 to about 50 percent
Alkaline earth metal oxide from about 4 to about 32 percent
Alkali metal oxide from about 20 to about 50 percent All of these fused homogeneous mixtures are prepared by chilling the molten mass as it is removed from the glass-making furnace onto a table or into pans, usually water-cooled, the glass forming in irregular pieces ranging in thickness from ⅛ inch to 2 inches. The length and width will vary as no effort is made to control these dimensions.

Other fused mixtures such as those described in U.S. Patent 2,370,472 are generally available in irregular walnut shaped lumps ranging in size from ½ inch to 1 inch in diameter. These are reduced to the desired particle size by grinding in a hammer mill, pebble mill, or other appropriate comminuting device.

I have found that while the granular product ranging from 8 mesh to 60 mesh in particle size has been reasonably satisfactory for use in feeding devices of the type mentioned, there are certain practical difficulties encountered in actual operation. Most feeders are of necessity made from cast metals and do not have any visual indicator to show the amount of polyphosphate chemical in the feeder at any given moment. The net result of this is that on many occasions the feeder will be completely exhausted long before the operator is aware of the situation and water running through the feeder will of course be untreated. The undesirable corrosion, scale, or red water development will naturally develop during the absence of the phosphate chemical. Additionally, it has been found through experience that the granular polyphosphates have a tendency to dissolve relatively rapidly as they are initially exposed to flowing water so that a much higher dosage of phosphate is introduced into the water system during the early stages of operating a full feeder than is necessary to achieve desired results. Further, toward complete exhaustion of the feeder a lesser amount than needed for protection is available. As a practical matter, 1 to 3 parts per million of the phosphate is a sufficient concentration for most applications for preventing calcium carbonate scale and any amount above the upper limit of the range is wasted in practice. A highly desirable situation would contemplate a slowly soluble polyphosphate which would maintain a virtually constant rate of solution throughout the life span of a given quantity placed in a dissolving feeder, for example a cooling tower for an air conditioning system could run for a whole season without further attention. With this in mind, I have developed a form of product which meets this requirement quite adequately.

I have found that if I make a chilled glass having a thickness ranging from about ³⁄₃₂ inch to about ¼ inch, preferably about ⅛ inch, and reduce the random sized pieces of this glass after it comes off the chilling apparatus to a fairly constant size, I am able to obtain the results which have long been sought after. The preferred product will all pass through a screen having 2 inch square openings and will be retained on a screen having ½ inch openings. Although the size of the finished product may vary within certain limits, any appreciable departure from the stated size, particularly on the small side, will detrimentally affect the uniform solubility rate of a given composition.

In the drawing, I have shown a comparison between the solubility characteristics of material having a chemical composition (by weight) of 18.0 percent CaO, 12.8 percent $Na_2O$, and 69.0 percent $P_2O_5$ in granular form which was all retained on a #30 and all of which passed through a #8 U.S. standard sieve (identified as 1A Micromet), and a product identified as Micromet 3G which is a fused product containing by weight 15.5 percent CaO, 16.3 percent $Na_2O$, and 68.0 percent $P_2O_5$, which is in my preferred plate form hereinbefore described.

While these two comparison products are not chemically identical, their "mean" solubility over an air conditioning season of 5–7 months will be about the same. Field trials have in fact confirmed this result. The comparison between the two products was made in accordance with the following procedure. Each of two identical pot type feeding devices was charged with 2 pounds of each product and was inserted by the usual by-pass arrangement into a water line through which Pittsburgh city tap water was flowed. The influent temperature was maintained at 85° F. and at periodic intervals the solid material remaining in the feeders was removed, dried, and weighed to determine consumption loss. Additionally, samples of effluent water were analyzed frequently for phosphate content. In the drawing, phosphate content of the effluent is plotted against time in days and at indicated points on each curve the weight loss is shown. In slightly more than a month almost 60 percent of the granular product has been spent, whereas in about 42 days only 26 percent of my new material has been dissolved. More important, after about 3 months, the granular product was providing less than ½ part per million of phosphate in the effluent and it is well known that when the phosphate concentration falls below this point, protection against scale, corrosion, and red water is entirely inadequate. My product in this test maintained between 0.75 and 1.0 part per million of phosphate in the effluent water from the 40th through the 140th day while the granular material failed to maintain 0.75 part per million of phosphate in the effluent after the 83rd day of the test. At the end of the test, in fact for the last 40 days of it, the phosphate was below 0.5 part per million in the effluent of the feeder containing the granular material.

My investigation of the solubility characteristics of the slowly soluble phosphate glasses extends over a wide range of materials and it is not my intention to limit this disclosure to the product which has undergone a comparison as shown in the accompanying drawing. For example, our product known as 13G, a plate form having the composition CaO—13.0%, $Na_2O$—18.75%, and $P_2O_5$—68.0% has a solubility rate about twice that of 3G.

I have found that any homogeneous vitreous material as a glassy water-soluble fusion product consisting analytically of the oxides MO, AMO, and $P_2O_5$ where M is an alkali metal and AM is an alkaline earth metal may be prepared in the physical form which I have here disclosed. For practical considerations, the compositions consisting of from about 25 to about 50 molar percent $P_2O_5$ and the MO and AMO making up the balance of the product are most readily adaptable to water treatment since they inherently dissolve at the desired rate under temperature and water flow conditions prevailing in most applications. In this latter category the preferred compositions are fused mixtures of CaO, $Na_2O$, and $P_2O_5$, these components (on a mol percent basis) being present in an amount ranging from about 4 to about 35, from about 20 to about 48, and from about 45 to about 50, respectively.

Specific examples of preferred compositions are as follows (percentages are molar):

| Product No. | CaO | $Na_2O$ | $P_2O_5$ |
|---|---|---|---|
| 3 | 27.1 | 26.0 | 46.8 |
| 8 | 17.8 | 21.1 (+13.5 ZnO) | 47.5 |
| 10 | 20.2 | 32.6 | 47.1 |
| 11 | 24.6 | 28.2 | 47.2 |
| 12 | 8.0 | 44.2 | 47.7 |
| 13 | 22.6 | 29.6 | 47.7 |
| 14 | 4.4 | 47.7 | 46.8 |

A MgO—$Na_2O$—$P_2O_5$ glass having the same amount of MgO as the CaO in #14, had approximately the same solubility rate.

While I have specifically described the preferred embodiments of my invention, it is to be understood that the invention is not so limited but may be otherwise embodied and practiced within the scope of the following claims.

I claim:

1. A homogeneous vitreous water-treating composition possessing properties of relatively uniformly slow solubility consisting of a water-soluble fusion product consisting analytically of the oxides MO, AMO, and $P_2O_5$ where M is an alkali metal and AM is an alkaline earth metal, said material having the physical form of discrete platelets ranging in thickness from about 3/32 inch to about ¼ inch and further characterized by the fact that they will pass through a screen having two-inch square openings but will not pass through a screen having one-half inch square openings.

2. A homogeneous vitreous material as described in claim 1 consisting analytically of the oxides calcium oxide, sodium oxide, and phosphorous pentoxide.

3. A homogeneous vitreous material is described in claim 1 consisting analytically of the oxides calcium oxide, sodium oxide, and phosphorous pentoxide, the molar percentages of each component ranging from about 4 to 30, about 20 to 48, and about 45 to 50 respectively.

4. A homogeneous vitreous material as described in claim 1 consisting analytically of the oxides CaO, $Na_2O$, and $P_2O_5$, the weight percentages of each component being in the range of from about 2 to 15, about 15 to 30, and about 65 to 70 respectively.

5. A material as described in claim 1 consisting analytically of CaO about 13 to 15 percent by weight, $Na_2O$ about 12 to 19 percent by weight, and $P_2O_5$ about 65 to 71 percent by weight.

6. A method of maintaining the desired concentration of phosphate ions in a water system for long periods of time and at a substantially uniform level, which comprises flowing the water in contact with a molecularly dehydrated phosphate consisting essentially of the oxides MO, AMO, and $P_2O_5$ where M is an alkali metal and AM is an alkaline earth metal, said phosphate being in the form of flat platelets having a thickness no greater than one-fourth inch, all of which pass through a screen having two-inch square openings and all of which are retained on a screen having one-half inch square openings.

7. A method as described in claim 6 where the molecularly dehydrated phosphate consists analytically of the oxides CaO, $Na_2O$, and $P_2O_5$.

8. A method as described in claim 6 where the molecularly dehydrated phosphate consists analytically of the oxides CaO, $Na_2O$, and $P_2O_5$, the molar percentages of each component ranging from about 4 to 30, about 20 to 48, and about 45 to 50 respectively.

9. A method as described in claim 6 where the molecularly dehydrated phosphate consists analytically of the oxides CaO, $Na_2O$, and $P_2O_5$, the weight percentages of each component being in the range of from about 2 to 15, about 15 to 30 and about 65 to 70 respectively.

10. A method as described in claim 6 where the molecularly dehydrated phosphate consists analytically of the oxides CaO, $Na_2O$, and $P_2O_5$, the molar percentages being 13 to 15, 12 to 19, and 66.5 to 69 respectively.

11. A method as described in claim 6 where the ratio of the plate thickness to the plate length is in the order of 1 to 20.

References Cited in the file of this patent

UNITED STATES PATENTS

| | | |
|---|---|---|
| 2,173,826 | Curtis | Sept. 26, 1939 |
| 2,370,473 | King | Feb. 27, 1945 |
| 2,493,809 | Garrison | Jan. 10, 1950 |
| 2,539,305 | Hatch | Jan. 23, 1951 |